United States Patent Office 3,104,256
Patented Sept. 17, 1963

3,104,256
ALICYCLIC CARBAMATE AND ITS PREPARATION
Martin A. Davis and Stanley O. Winthrop, Montreal, Quebec, Canada, assignors to American Home Products Corporation, New York, N.Y., a corporation of Delaware
No Drawing. Filed Mar. 1, 1962, Ser. No. 176,784
4 Claims. (Cl. 260—482)

This invention concerns a carbamate ester, namely the carbamate ester of 5-hydroxydibenzo[a,d][1,4]cycloheptadiene. It is also concerned with the process by which the new chemical compound is prepared.

The new compound has been found to possess significant anticonvulsant action in experimental animals as determined by its ability to protect the animals against the effects of administered electroshock. The compound is active when given either orally or by injection, and the anticonvulsant effects are elicited at doses well below those causing toxic manifestations. Moreover, the compound possesses no hypnotic action when administered in dosages substantially higher than those required for anticonvulsant effect.

Significantly, the new carbamate ester has a considerably longer duration of action than the unesterified alcohol, thus indicating its use as a long-acting anticonvulsant agent. Recommended therapeutic dosages would be from 400 to 1,000 mg. per day, given in suitably divided forms.

The compound of this invention may be prepared by treating the parent alcohol, 5-hydroxydibenzo[a,d][1,4]-cycloheptadiene, with phenyl chloroformate in an acid-binding reaction solvent, e.g. pyridine. The parent alcohol and its preparation are described by V. Mychajlyszyn and M. Protiva, Coll. Czech. Chem. Comm. 24, 3955 (1959). The intermediate phenyl carbonate ester is then treated with ammonia to give the desired product, which is isolated and purified. This procedure for forming carbamates is described by W. M. McLamore, S. Y. P'An, and A. Bavley in J. Org. Chem., 20, 1379 (1955), who have used it to prepare compounds from a variety of tertiary acetylenic alcohols.

The following formulae and example illustrate our invention:

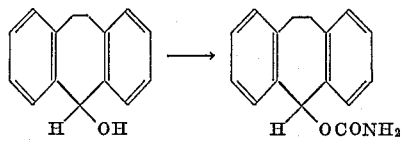

Example

Phenyl chloroformate (7.8 g., 0.05 mole) was added dropwise and with stirring to an ice-cold solution of 5-hydroxydibenzo[a,d][1,4]cycloheptadiene (10.5 g., 0.05 mole) in dry pyridine (30 ml.). The reaction mixture was stirred for three hours at room temperature and was then treated with water (100 ml.). The solid which had formed was extracted into benzene and the benzene layer was extracted successively with cold, dilute hydrochloric acid, saturated sodium bicarbonate solution, and saturated sodium chloride solution. The organic layer was dried over sodium sulfate, filtered and concentrated in vacuo to about 50 ml. Ether (150 ml.) was added. This solution was then added, with stirring, to liquid ammonia (250 ml.) and the mixture was left to evaporate overnight. Equal volumes of ether and water were added, the lower aqueous layer was extracted with benzene, and the combined organic layers were extracted with cold, dilute sodium hydroxide solution (to remove phenol), followed by saturated sodium chloride solution. Drying of the organic phases followed by evaporation in vacuo left a white, crystalline residue (3.9 g., 31% yield) of the carbamate of 5-hydroxydibenzo[a,d][1,4]cycloheptadiene, M.P. 171–172° (decomp.), unchanged on recrystallization from ethyl acetate-hexane mixture.

Analysis confirmed the empiric formula $C_{16}H_{15}NO_2$.

Required: C, 75.87%; H, 5.97%; N, 5.53%. Found: C, 76.30%; H, 6.07%; N, 5.62%, 5.65%.

We claim:
1. 5 - hydroxydibenzo[a,d][1,4]cycloheptadiene carbamic acid ester.
2. The compound of the formula

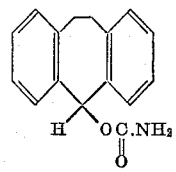

3. The process of preparing the carbamic acid ester of 5-hydroxydibenzo[a,d][1,4]cycloheptadiene which comprises treating 5-hydroxydibenzo[a,d][1,4]cycloheptadiene with phenyl chloroformate in an acid-binding solvent to form the phenyl carbonate ester of 5-hydroxydibenzo[a,d][1,4]cycloheptadiene, and then treating said phenyl carbonate ester with ammonia to form said desired product.
4. The process defined in claim 3 wherein the acid-binding solvent is pyridine.

No references cited.